(12) United States Patent
Springer et al.

(10) Patent No.: US 6,169,354 B1
(45) Date of Patent: *Jan. 2, 2001

(54) THIN FILM ELECTRIC MOTORS

(75) Inventors: Gilbert D. Springer; Mark F. Springer, both of Fremont, CA (US)

(73) Assignee: Halo Data Devices, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/653,168

(22) Filed: May 24, 1996

(51) Int. Cl.$^7$ ............................................. H02K 1/22
(52) U.S. Cl. ................. 310/268; 310/67 R; 310/68 R; 310/40 MM
(58) Field of Search ............................. 310/67 R, 68 R, 310/40 MM; 360/99.8

(56) References Cited

U.S. PATENT DOCUMENTS

| | | | |
|---|---|---|---|
| 3,060,337 | 10/1962 | Henry-Baudot | 310/268 |
| 3,774,059 | 11/1973 | Cox | 310/49 |
| 3,887,854 | 6/1975 | Parks | 318/224 A |
| 4,093,897 | 6/1978 | Fujita et al. | 218/138 |
| 4,260,926 | 4/1981 | Jarret et al. | 310/254 |
| 4,288,709 | 9/1981 | Matthias et al. | 310/49 R |
| 4,459,502 | 7/1984 | El-Antably . | |
| 4,520,300 | 5/1985 | Fradella | 318/603 |
| 4,578,610 | 3/1986 | Kliman | 310/156 |
| 4,607,182 | 8/1986 | Ballhaus . | |
| 4,661,733 | 4/1987 | Heyraud | 310/68 R |
| 4,672,250 * | 6/1987 | Seitz | 310/90 |
| 4,672,347 | 6/1987 | Garcia et al. | 336/132 |
| 4,712,027 | 12/1987 | Karidis . | |
| 4,716,329 | 12/1987 | Oh | 310/183 |
| 4,719,377 | 1/1988 | Horie et al. | 310/44 |
| 4,733,115 * | 3/1988 | Barone et al. | 310/68 R |

(List continued on next page.)

OTHER PUBLICATIONS

Miller, T.J.E., Switched Reluctance Motors and their Control, Magna Physics Publishing and Clarendon Press:Oxford (1993).

* cited by examiner

Primary Examiner—Elvin Enad
(74) Attorney, Agent, or Firm—Sawyer Law Group LLP

(57) ABSTRACT

An electric motor having a pancake construction stator and rotor poles that are formed by photolithography. The stator and rotor can be formed from an amorphous material, thereby reducing grain boundaries and allowing smaller poles to be etched. The number of poles, never less than three, can be from 20 to 5000 times the stator diameter in centimeters. The extremely thin rotor comprises a flexible disk spaced from the stator by an air cushion maintained in accordance with forces as dictated by Bernoulli's principle. This insures that the spacing between the rotor and stator is automatically adjusted to minimize the distance between the rotor and stator poles and thereby to maximize flux linkage between the poles. By operating the motor in a range that avoids saturation of the poles, a variable torque motor is provided since increased current through the motor windings allows the magnetic field intensity and thus the flux linkage to increase. Furthermore, by varying the frequency at which the stator windings are fired, the speed of rotation of the rotor can be adjusted. Since an amorphous material such as METGLAS displays high coercivity, rapid changes in frequency can be achieved and rapid switching maintained to insure application of power only during periods of maximum torque. The motor further includes detector windings that monitor magnetic coupling between certain stator poles and the rotor poles, magnetic flux being produced in the certain stator poles by means of a high frequency signal winding. The detector windings comprise four windings capable of monitoring the exact position of the rotor poles of a six phase motor, for purposes of controlling the firing of the phases.

11 Claims, 17 Drawing Sheets

U.S. PATENT DOCUMENTS

| | | |
|---|---|---|
| 4,754,207 | 6/1988 | Heidelberg et al. ............... 318/254 |
| 4,794,289 | 12/1988 | Barnaby . |
| 4,820,949 * | 4/1989 | Mizobuchi et al. ................. 310/90 |
| 4,831,300 | 5/1989 | Lindgren . |
| 4,837,474 * | 6/1989 | Petersen et al. .................... 310/254 |
| 4,883,999 | 11/1989 | Hendershot ........................ 310/254 |
| 4,922,145 | 5/1990 | Shtipelman ...................... 310/49 R |
| 4,949,000 * | 8/1990 | Petersen ............................. 310/179 |
| 4,958,098 | 9/1990 | Sarraf ................................. 310/156 |
| 4,970,423 * | 11/1990 | Tamae et al. ...................... 310/162 |
| 5,021,698 | 6/1991 | Pullen et al. . |
| 5,028,830 | 7/1991 | Mas .................................... 310/211 |
| 5,039,895 * | 8/1991 | Meister ................................ 310/68 |
| 5,053,667 | 10/1991 | Oudet ................................. 310/268 |
| 5,063,318 | 11/1991 | Anderson ........................... 310/156 |
| 5,089,732 * | 2/1992 | Konno et al. ..................... 310/67 R |
| 5,111,095 | 5/1992 | Hendershot ........................ 310/168 |
| 5,113,100 | 5/1992 | Taghezout ..................... 310/40 MM |
| 5,126,606 | 6/1992 | Hofmann ......................... 310/49 R |
| 5,144,183 | 9/1992 | Farrenkopf ......................... 310/268 |
| 5,164,622 | 11/1992 | Kordik .............................. 310/67 R |
| 5,177,054 | 1/1993 | Lloyd et al. ............................. 505/1 |
| 5,187,399 | 2/1993 | Carr et al. . |
| 5,216,310 | 6/1993 | Taghezout ......................... 310/268 |
| 5,229,677 | 7/1993 | Dade et al. ........................ 310/268 |
| 5,245,235 | 9/1993 | Nagai et al. ..................... 310/67 R |
| 5,396,134 | 3/1995 | Mochizuki ......................... 310/268 |
| 5,412,265 | 5/1995 | Sickafus ...................... 310/40 MM |
| 5,459,627 * | 10/1995 | Peter ............................... 260/98.08 |
| 5,590,003 * | 12/1996 | Dunfield et al. ................. 360/98.07 |
| 5,592,037 * | 1/1997 | Sickafus ...................... 310/40 MM |
| 5,608,278 | 3/1997 | Mey et al. . |
| 5,846,648 | 12/1998 | Chen et al. . |
| 5,903,082 | 5/1999 | Caamano . |
| 5,907,455 | 5/1999 | Dunfield . |
| 5,908,514 | 6/1999 | Ranjan et al. . |
| 5,909,069 | 6/1999 | Allen et al. . |
| 5,940,247 | 8/1999 | Karis et al. . |
| 5,969,902 | 10/1999 | Okumura et al. . |
| 5,973,878 | 10/1999 | Yoshida et al. . |

FIG. 14
FIG. 13
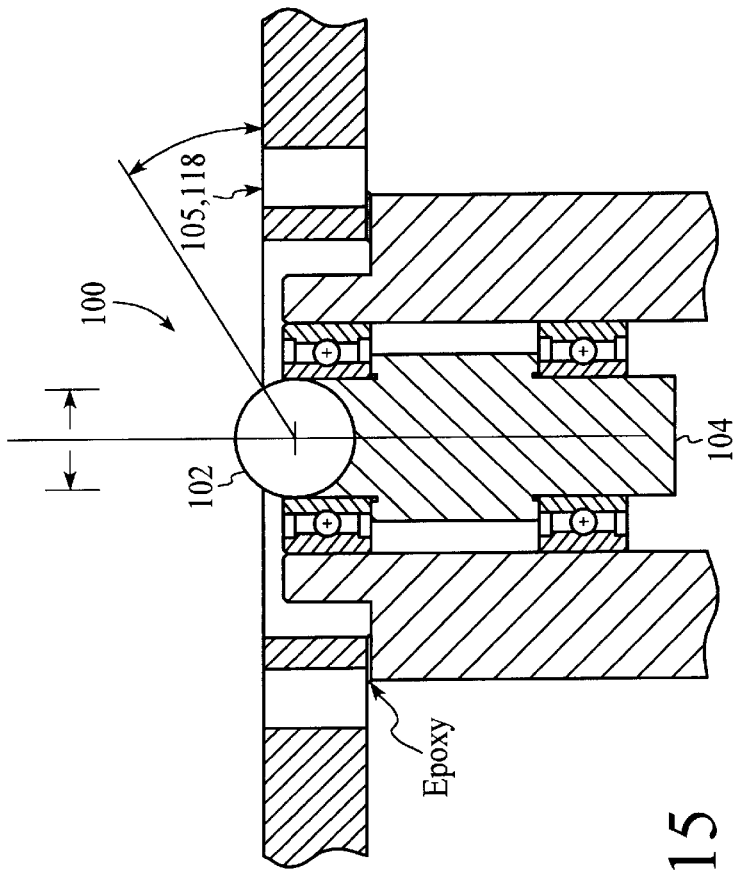
FIG. 15

THIN FILM ELECTRIC MOTORS

FIELD OF THE INVENTION

This invention relates to electric motors and methods for their manufacture.

BACKGROUND OF THE INVENTION

Over the years much development has taken place in the manufacture of electric motors to increase the operating characteristics and their efficiency and also to reduce their size and cost. Recent developments in motor technology include the variable reluctance motor that first became widely known in the early 1980's. This is an electric motor in which torque is produced by the tendency of its movable part to move to a position where the inductance of the excited winding is at a maximum. The windings of the various phases are typically excited when the inductance is increasing and are unexcited when the inductance is decreasing, for purposes of motoring operation. Two types of reluctance motors may be distinguished, including the switched reluctance motor, sometimes also referred to as a variable reluctance motor, in which excitation comprises a sequence of current pulses applied to each phase in turn, and synchronous reluctance motors in which excitation comprises a set of polyphase balanced sine wave currents.

In spite of the developments in the motor industry, various shortcomings may be distinguished in existing electric motors.

In U.S. Pat. No. 3,060,337 to Henry-Baudot, an electric motor is disclosed in which the windings are produced by making use of printed circuit techniques. However, the number of poles appears to be limited to 24 poles. The limited number of poles increases the amount of cogging and reduces the efficiency by increasing the amount of eddy currents due to the increased cross-sectional area of the material. Many other motors use even fewer poles thereby exacerbating the problems.

U.S. Pat. No. 4,260,926 to Jarret et al. discloses an embodiment using 48 stator poles and 58 rotor poles. While addressing some of the problems mentioned above, it nevertheless fails to address the possibility of providing a variable torque facility since the poles are driven into saturation. Furthermore the number of poles are limited by the physical construction of the poles.

U.S. Pat. No. 3,887,854 to Parks defines a variable speed motor. It however, does not have the facility for varying the torque. Clearly it would be desirable to have a motor displaying both variable speed and variable torque characteristics.

The use of amorphous materials for the stator body has been considered in a number of patents including U.S. Pat. No. 4,578,610 to Kliman et al. in which an amorphous metal tape is wound in an annular fashion. Poles are formed in the stator by machining slots into it. The rotor, in turn, is provided with a plurality of equally spaced permanent magnets. Another application of the use of an amorphous metal alloy is that described in U.S. Pat. No. 5,028,830 to Mas wherein an amorphous metal alloy strip is wound about a hub. In both of the above patents the poles are mechanically formed, thus limiting the number of poles that can be formed on the stator.

Developments have also been made to reduce the thickness of motors by making use of a planar construction as discussed in U.S. Pat. No. 4,922,145 to Shtipelman. The rotor in this patent, however, includes a plurality of discrete permanent magnets, thereby once again limiting the number of poles that can be formed on the rotor. The stator comprises two plates, one on either side of the rotor disk, the poles being defined by 20 pairs of poles on each of the stator disks. While these are described as being formed either in a conventional manner or by using photofabrication, the poles of the stator extend radially and are limited in number by the magnets of the rotor. The concept of producing the windings using an etching process is also considered in U.S. Pat. No. 5,021,698 to Pullen et al. However, neither Pullen nor any of the other prior art references consider forming poles, as opposed to the windings, using a lithographic process.

Another development has been the concept of using flat motors which was considered in U.S. Pat. No. 5,144,183 to Farrenkopf. Switching, however, is achieved by means of a commutator, which again limits the number of stator poles that can be incorporated in the motor. Another micro-motor is disclosed in U.S. Pat. No. 5,216,310 to Taghezout in which a magnetic field is established substantially parallel to the axis of rotation. The rotor, however, comprises a magnetized rotor producing a magnetic field. The use of magnets in the rotor once again limits the number of poles.

In U.S. Pat. No. 5,229,677 to Dade et al. a pancake configuration motor is disclosed with an axial air gap, thrust bearings maintaining the position of the rotor relative to the stators. Once again, the rotor includes a plurality of permanent magnets, which limit the number of rotor poles.

U.S. Pat. No. 5,412,265 to Sickafus discloses yet another planar micro-motor. This motor provides the added advantage of achieving speed and direction control by regulating the energizing of micro-coils on the stator. Once again, however, the poles of the rotor are envisaged to be permanent magnets or are made of a magnetically soft material such as iron. The use of such discrete rotor poles limits the number of poles that can be produced on a rotor disk.

As mentioned above, the limit in the number of poles leads to inefficiency insofar as the cross sectional area of each pole is relatively large thereby producing large eddie currents. Since the switching frequency is also reduced by the smaller number of poles, the skin depth of current flow increases, thereby requiring thicker rotors when using them for purposes of magnetized storage media such as hard disk drives. Furthermore, the smaller the number of poles, the greater the amount of cogging that takes place and the lower the accuracy with which the position of the rotor relative to the stator can be determined.

OBJECTS AND SUMMARY OF THE INVENTION

It is an object of the invention to provide an electric motor having a wide range of sizes and number of poles. One such motor has a stator; and a rotor rotatably mounted relative to the stator, wherein the number of stator poles is from 20 to 5000 times the diameter of the stator in centimeters, and the number of stator poles is never less than three.

It is a further object of the invention to provide a motor in which one or both of the rotor and stator disks are made from an amorphous material or an electroformed material which may not be amorphous.

It is yet a further object of the invention to provide a motor in which one or both of the rotor and stator poles are produced using etching techniques.

It is yet a further object of the invention to operate the motor of this invention with a flux density less than saturation except when necessary to increase power. In particular, it is an object of the invention to provide a variable torque motor by maintaining the flux density below saturation point to allow room for increased flux density and thus increased torque.

It is a further object of the invention to provide a variable torque and variable speed motor.

It is yet another object of the invention to provide a highly efficient electric motor by energizing the coils of the motor during only selected periods of flux linkage.

It is yet another object of the invention to provide a motor with a small air gap between the stator and the rotor and to provide a thin profile electric motor. In particular it is an object of the invention to provide an electric motor such as a variable reluctance motor having a pancake configuration in which the stator and a rotor are separated by an air cushion, maintained using the Bernoulli effect. More particularly, it is an object of the invention that gap adjustment between the stator and rotor disks take place automatically by using flexible disks. It is, further, an object of the invention to provide channels in the rotor or the stator, thereby to adjust air flow and hence the hydrostatic pressure and the air gap between the rotor and stator.

It is yet another object of the invention to provide a means for accurate position detection of the rotor relative to the stator, even at standstill.

It is yet another object of the invention to provide a drive mechanism for a recording medium. In particular it is an object of the invention to provide a drive mechanism for a recording medium that makes using of longitudinal recording, and a drive mechanism for a recording medium that makes use of perpendicular recording.

It is yet a further object of the invention to provide an electric motor operating at sufficiently high frequencies to increase magnetic skin effect and reduce interference with a recording medium associated with the motor.

It is yet another object of the invention to provide relative rotor/stator pole shapes that ensure unidirectional movement of the rotor.

According to the invention there is provided an electric motor comprising a stator and a rotor rotatably mounted relative to the stator, wherein the stator includes a number of stator poles formed on a single substrate.

The rotor is typically mounted on a bearing assembly defining a rotational axis. In order to centralize the rotor relative to the bearing assembly, the bearing assembly can include a centralizing means that engages a central hole of the rotor. The bearing assembly may comprise a central nib and annular ring extending from a lower surface of the rotor that engage complementary recesses in the stator. The ring is connected to a plate made of a magnetic material, and the bearing assembly includes a magnet with a central pole of one polarity and a peripheral pole of a second polarity for magnetically linking with the ring and plate to centralize the rotor relative to the magnet.

In order to insure unidirectional movement of the rotor, the rotor and stator poles may have a relative configuration that insures maximum flux linkage between the stator poles being fired and rotor poles that are located next in line to be drawn in by flux linkage between the stator poles being fired and the rotor poles.

Further, in accordance with the invention, there is provided an electric motor comprising a stationary part including a first substrate and a plurality of first poles formed on the first substrate, and a movable part movably mounted relative to the stationary part and including a second substrate and a plurality of second poles formed on the second substrate, wherein the plurality of first poles are integrally formed on the first substrate and the plurality of second poles are integrally formed on the second substrate.

At least the stationary part or the movable part can be made from an amorphous or electroformed material deposited on a suitable substrate such as a ceramic. Fake diamond substrates can also be used.

The electric motor can be a reluctance motor that is a variable speed motor, the speed being dictated by relative power amplitude and the switching frequency at which power is applied to excitation windings of the motor.

Still further, in accordance with the invention, there is provided an electric motor comprising a stationary part, and a movable part movably mounted relative to the stationary part and spaced from the stationary part by an air cushion maintained by Bernoulli effect caused by an inflow of air into the low pressure zone formed in the space between the movable part and the stationary part. This low pressure zone is formed by the circular movement of the air caused by the surface for the moveable part, causing it to be expelled from said space.

Air passages are typically formed in the rotor or the stator for channeling air into the space between the rotor and the stator, and the rotor or the stator typically is in the form of a flexible disk that automatically adjusts the spacing between the rotor and the stator in response to the relative pressures exerted on the surfaces of the disk. Air flow of the air being expelled can be further controlled by means of channels formed in the rotor or the stator.

In order to determine which windings are to be fired the relative positions of the rotor and stator poles is determined by means of a position sensor. In a six phase motor, this can take the form of 4 sensor windings associated with 4 stator poles for sensing the magnetic flux linkage between the stator poles and rotor poles. In order to allow the sensing to take place even when no power is applied to the motor windings, a high frequency signal winding is provided that generates flux in the poles associated with the sensor windings.

Still further, in accordance with the invention, there is provided an electric motor comprising a stationary part and a movable part, movably mounted relative to the stationary part, and spaced from the stationary party by a cushion of air, wherein at least one of the stationary part and the movable part comprises a flexible disk.

Still further, in accordance with the invention, there is provided a recording system comprising an electric motor of the invention, a recording layer rotatably propelled by the electric motor, and a recording head mounted in proximity to the recording medium.

Still further, according to the invention, there is provided a method of manufacturing an electric motor comprising the steps of providing a rotor substrate and a stator substrate and photolithographically forming rotor poles on a surface of the rotor substrate and stator poles on a surface of the stator substrate.

The windings on the stator substrate may also be formed by photolithography.

Where the rotor substrate is made of an amorphous material, it is typically prepared to provide flatter surfaces by placing the rotor substrate under pressure and elevated temperature between two copper plates. The amorphous material is also stabilized to prevent distortions of the material when subsequently exposed to higher temperatures. This is achieved by placing the rotor substrate in a partial vacuum of inert gasses, at elevated pressure and temperature.

Still further, in accordance with the invention, there is provided a method of operating a reluctance motor, comprising the steps of providing a reluctance motor having a stationary part and a moving part, the stationary part having first poles made of a magnetic material, and the moving part having second poles made of a magnetic material, wherein the stationary part has excitor windings for generating magnetic flux between the first poles and the second poles. Magnetic flux is generated between a first set of the first poles and a first set of the second poles, the first set of the second poles having an orientation relative to the first set of the first poles to generate a force between the stationary part and the moving part to cause the moving part to move relative to the stationary part in a predetermined direction. Thereafter magnetic flux is generated between a second set of the first poles and a second set of the second poles that has an orientation relative to the second set of the first poles to generate a force between the stationary part and the moving part to cause the moving part to move relative to the stationary in the predetermined direction. The generation of magnetic flux is controlled to avoid saturation of the magnetic material of the poles.

The torque and acceleration of the motor may be adjusted by controlling the current through the windings thereby controlling the flux linkage between the stator poles and rotor poles. The speed of the motor can be controlled by adjusting the switching frequency at which power is applied to successive phases.

BRIEF DESCRIPTION OF THE DRAWINGS

FIG. 13 is a plan view of part of a rotor of the invention, showing a fiducial;

FIG. 14 is a plan view of part of a fiducial formed on the stator;

FIG. 15 is a side view of another embodiment of a bearing assembly having means for automatically centralizing the rotor and stator;

DETAILED DESCRIPTION OF THE INVENTION

Figure 1:
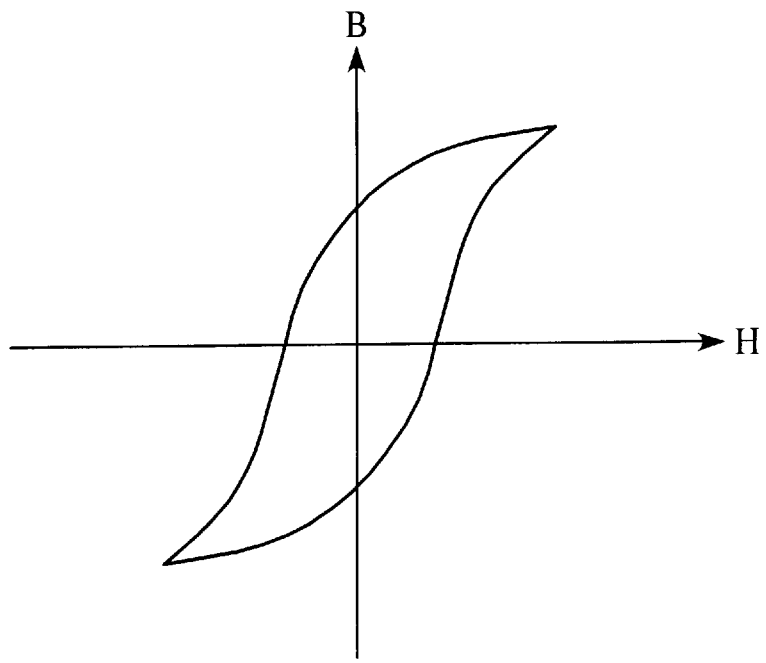
FIG. 1 is a flux density versus field intensity curve for a typical magnetic material.

The present invention seeks to provide an entirely new motor with numerous beneficial features including high efficiency and the ability to provide both variable speed and variable torque characteristics. In addition, the invention provides the facility for producing extremely small motors.

In accordance with the invention, a motor is proposed in which the poles of the stator and the rotor are produced by an etching process in which material of the rotor and the stator substrates is removed to leave behind islands defining the poles. The use of a photolithography process to form the poles allows the number of poles greatly to be increased since the etching process avoids the need for manufacturing and mounting discrete poles on the rotor and stator substrates. While prior art motors have used photolithographic processes for defining stator windings, the concept of providing poles using a photolithographic etching process is new and provides a produce for producing not only the windings but also the poles on the stator and the rotor, thereby eliminating many of the limitations on the number of poles on the rotor and stator found in prior art motors. In particular, it is envisaged to provide a stator can have as few as three poles if it is very small, i.e., in the micron size range or thousands for stators having a diameters of two centimeters or more. One such motor, in a pancake configuration comprises a stator; and a rotor rotatably mounted relative to the stator, wherein the number of stator poles is from 20 to 5000 times the diameter of the stator in centimeters, and the number of stator poles is never less than three.

By increasing the number of poles, the rate of switching invariably increases as well. The higher switching frequency, which in one embodiment discussed in greater detail below is 2 Mhz, results in various benefits. In the first instance torque ripple is reduced thereby reducing cogging. Furthermore, skin depth is inversely proportional to frequency as given by the equation:

$$\sigma = 2\Pi \sqrt{\rho/\mu_R f}$$

wherein $\sigma$ is electrical conductivity, $\mu_R$ is relative permeability, and f is frequency.

Furthermore, for maximum efficiency, pole height is typically of the order of 50% of the value of the pole pitch. Thus, by increasing the number of poles, the pole pitch is reduced, resulting in reduced pole height. This reduces the cross sectional area of each pole and therefore reduces the eddie current losses.

In order to permit rapid switching, inductance must be low. Furthermore the material must display high permeability and low coercivity, i.e., the flux density must rapidly increase with increase in field intensity as given by the flux density versus field intensity curve illustrated in FIG. 1. Flux density B is defined as the ratio of flux ($\phi$) per unit area (A) as given by the equation:

$$B = \frac{\phi}{A}$$

Field intensity H, in turn is proportional to the amount of current and is given by the equation:

$$H = NI$$

where I is current and N is the number of turns in a winding.

Flux density is also related to field intensity multiplied by the permeability $\mu$ as illustrated in FIG. 1 and as given by the equation:

$$B = \mu N$$

Another requirement is that the flux density be dissipated quickly as field intensity is reversed. This is given by the coercivity $\sigma$. Thus the smaller the coercivity, the faster the switching times.

By using a low coercivity pole material and switching from one pole to the next before the material saturates, field intensity can be increased only during periods of maximum torque. This avoids power being applied when the torsional forces are low. Specifically, in the embodiment discussed in greater detail below, saturation takes place at 8000 to 15,000 Gauss, and the motor is operated at a level of only approximately 2,000 Gauss. By operating at low flux density, further flux density increases can be achieved by increasing field intensity, thus achieving a variable torque motor. Since field intensity is proportional to current, increasing the current will increase the field intensity H and therefore the flux intensity B. This is given by the equations H=NI and B=$\mu$H as set out above.

In accordance with the invention a high permeability, low coercivity material is used having a high saturation point and low inductance. Two proposed motor pole materials with the requisite physical characteristics are tabulated below. These include METGLAS produced by Allied Signal Inc. by rapidly quenching a carefully blended melt on a chilled wheel at 1 million ° C./sec, and Permalloy produced by electro forming using a wet plating chemical.

| METGLAS | Permalloy |
| --- | --- |
| High permeability [$\mu$ = 400,000] | High permeability [$\mu$ = 20,000] |
| Low coercivity [$H_c$ = 0.01 Orstedt] | Low coercivity [$H_c$ = 0.10 orstedt] |
| High saturation [approx. 10,000 Gauss] | High saturation [8,000 Gauss] |
| Low inductance high strength characteristics [550,000 lb. per sq. Inch] | Low inductance |
| Extremely thin [1/1000 Inch thick] | |
| Amorphous material, therefore no grain boundaries. | |

Figure 2:
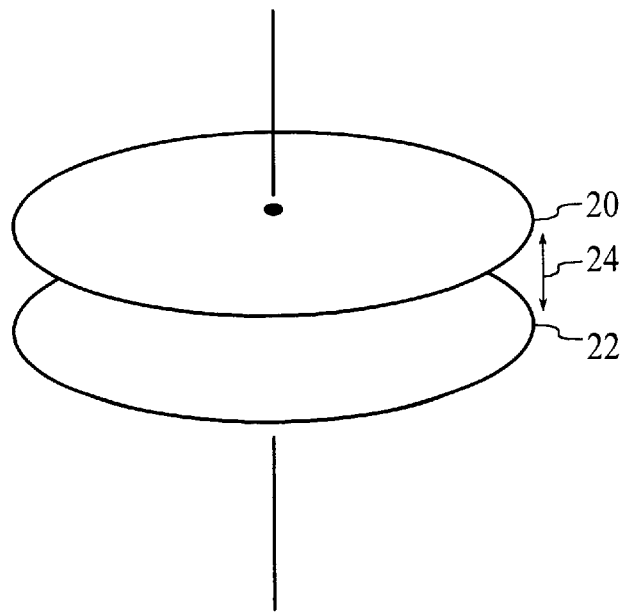
FIG. 2 is a schematic isometric representation of a rotor and stator separated by an air cushion in accordance with the invention.
Figure 3:
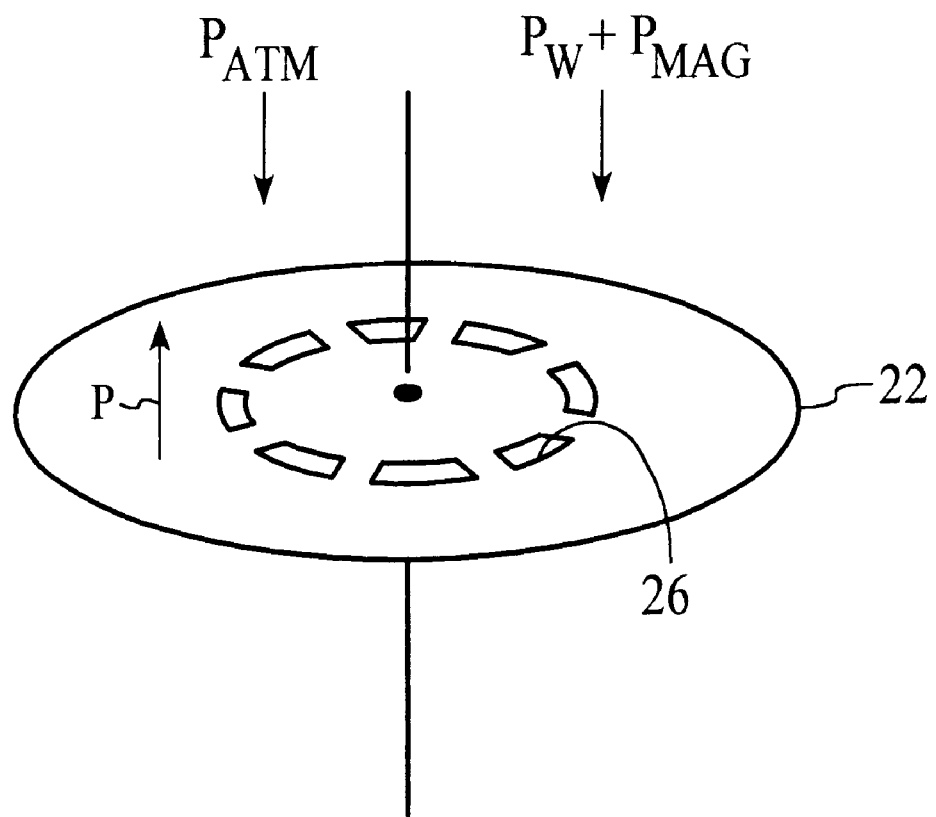
FIG. 3 is a schematic representation of a stator of the invention showing holes for influx of air to create the air cushion, and showing the various pressures exerted on the stator.

In accordance with a preferred embodiment a pancake configuration motor is disclosed. This allows an extremely thin motor to be produced. The motor of this configuration includes a rotor disk spaced from a stator disk and separated from the stator disk by an air cushion. The gap between the rotor and stator is automatically controlled by virtue of the Bernoulli effect. The rotor and stator are schematically represented in FIG. 2, the rotor 20 being spaced from the stator 22 by an air gap 24. As shown in FIG. 3, the stator 22 is provided with holes 26 for supplying air to the region between the stator and the rotor. Rotation of the rotor causes a sub-ambient air pressure to develop when the air between the rotor and the stator moves outwardly under centrifugal forces thereby forcing air through the holes 26. Magnetic forces between the rotor and stator as well as the weight of the rotor and the atmospheric pressure on the rotor are balanced by the air cushion pressure. This is given by the equation P=$P_{atm}$+$P_{mag}$+$P_w$. However, since the mass of the rotor is extremely low, the pressure $P_w$ due to the rotor weight is not significant relative to the air pressure forces, and the motor will perform well in any orientation. The motor is therefore substantially orientation independent. The rotor disk is made of a flexible material such as METGLAS to allow it to adjust to pressure changes along its surface. This configuration provides not only an extremely thin motor but also provides for an extremely small air gap thereby producing high flux linkage between the stator and rotor poles. This results in a substantial torque gain and reduces the amount of power required. Only about 1.75 watts is required for the first 18 ms during start up of the motor embodiment discussed in greater detail below, whereafter power consumption is of the order of 415 mW until full running speed is achieved with no auxiliary load in about 100 ms. Running power is approximately 190 mW at a running speed of 6,000 to 7,200 rpm. This increase in torque is given by the equation:

$$\tau = \frac{CN^2I^2L}{2G}$$

where τ is torque
N is the number of windings
I is current
L is the pole length
G is the air gap between the rotor and stator poles.

The extremely small air gap between the rotor and stator provides for further advantages when using the motor as part of a magnetic recording medium in which longitudinal recording is to take place. This is discussed in greater detail below.

The bearing used to support the rotor relative to the stator is discussed in greater detail below and can include a jewel bearing where bearing run out is not critical. Instead, a fluid bearing can be used where jewel run out values are critical. Yet another option is to use a unique "bearing" comprising a central bead and an annular member secured to the rotor and centralized by means of a magnet as discussed in greater detail below.

In order to take advantage of switching during maximum torque periods it is necessary that the relative positions of the stator and rotor poles be accurately determined within 10% of pole width. To achieve this a unique detector is disclosed in which the flux curves of four poles are monitored using four detector windings on the stator and generating a high frequency signal such as a 10 MHz signal in high frequency winding on the stator to dynamically monitor the flux changes with time in the detector windings. This insures accurate firing of the stator motor windings. The detector is described in greater detail below.

A further feature of the invention is to provide a relative stator/rotor pole configuration that insures that the leading edge of a rotor pole is substantially parallel to the adjacent stator pole edge during firing and that the stator pole edge is angled relative to the adjacently located rotor poles to avoid a reverse torque in the event of premature firing. This insures that the motor operates as a unidirectional motor.

Yet a further feature of the motor described above and considered in greater detail below is its suitability for use as part of a magnetic storage medium in which bits of information are stored, such as a hard disk drive. By being able to change speed rapidly, it is ideally suited to permit different numbers of bits per track, depending on the track length.

Figure 4:
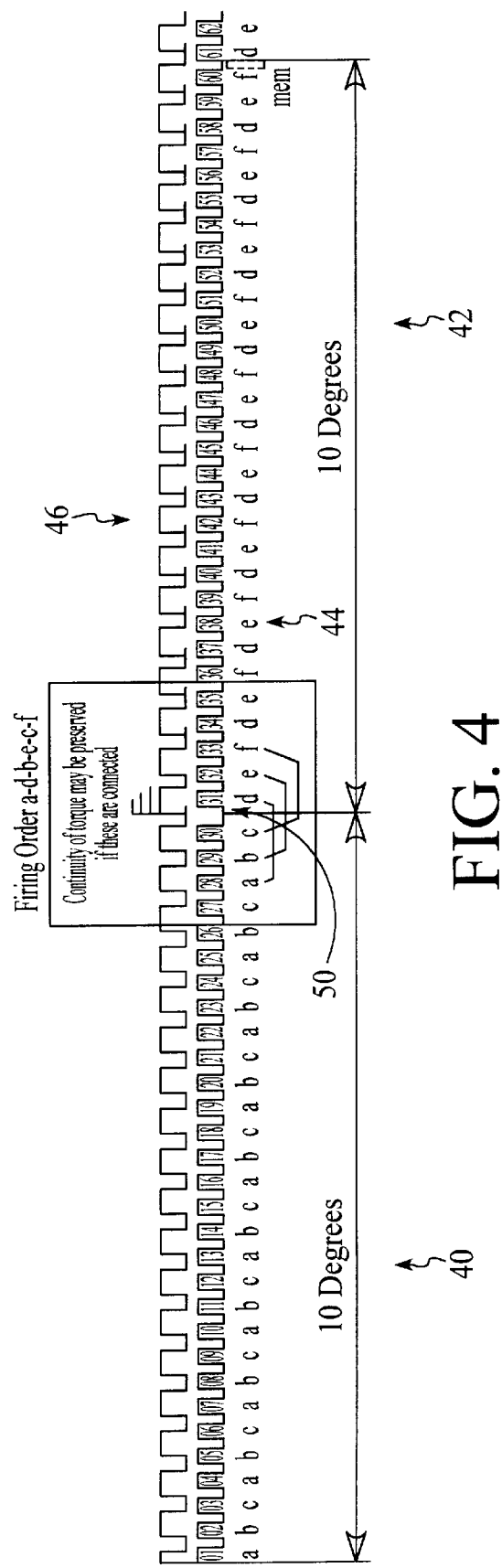
FIG. 4 is a schematic representation of two segments of a rotor and a stator showing the firing order.

A specific example will now be considered in greater detail below. The specific example considered is a pancake configuration motor in which both the rotor and stator disks are made from an amorphous material such as METGLAS. The particular embodiment comprises a six phase motor wherein the stator poles are arranged into 36 segments of substantially 30 poles each. Referring to FIG. 4, the first segment 40 spans an angular distance of 10° and comprises motor poles "a", "b", and "c" repeated ten times to make up a total of 30 stator poles. The next segment also covers 10° and is made up of stator pole phases "d", "e" and "f" repeated substantially ten times. However, one pole falls away as is discussed in detail below. The stator poles 44 have a pole-face to gap ratio of 36:44 while the rotor poles 46 have a pole-face to gap ratio of 1:2. In the particular embodiment the stator poles have an inside radius pitch of 80 μm, covering an angular distance of 0.3330°, while the rotor poles have a pitch of 120 μm and cover an angle of 0.5°.

In order to fire the various stator windings a parallel-serial bus connection is provided in which one bus serves one phase in a segment. Thus, all phases "a" in the first segment are connected to a single bus line, all phases "b" in the first segment are connected to a second bus line and all phases "c" in the first segment are connected to a third bus line. Similarly, phases "d", "e" and "f" in the next segment are connected to three different bus lines. There are thus a total of 3 bus lines per segment to provide a total of 3×36 buses for the motor. Therefore, if one bus line should malfunction, only ten poles would be lost.

It takes 6 firings or steps to advance the rotor by 0.3330° (80 μm inside pole radius). The firing order is a d-b-e-c-f. The rotor moves by the distance of 13.33 μm between each firing which accounts for the additional 20 μm stator pole pitch at location 50 between segments 40 and 42. Thus, once the "a" phases in segment 40 have fired the rotor moves by a 13.33 μm distance to the left to bring phases "d" in segment 42 into firing position. Since all common phases, for example all the "a"'s are fired simultaneously for all the segments, during each firing one stator pole will be on and the next two stator poles will be off. This causes flux linkage between alternating rotor poles.

Figure 5:
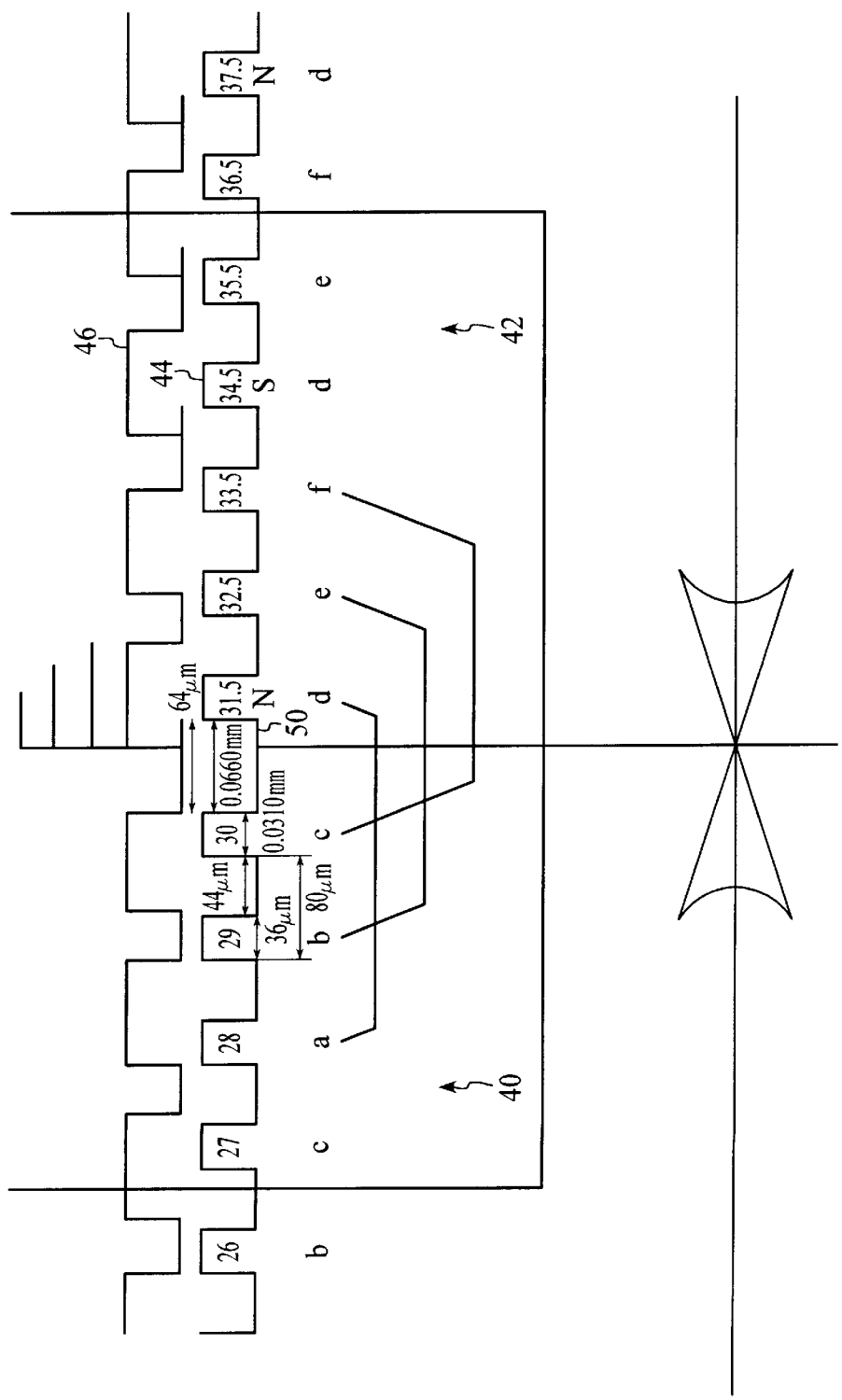
FIG. 5 is a detailed view of a portion of the rotor and stator illustrated in FIG. 4.
Figure 6:
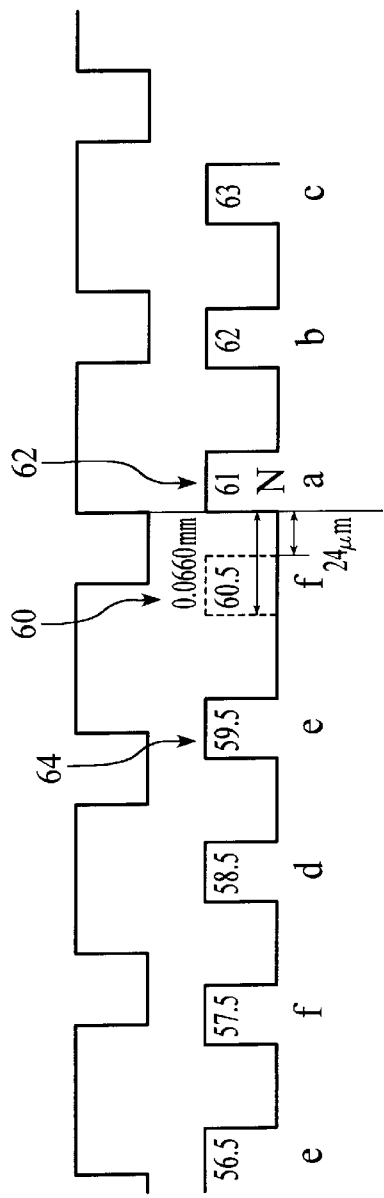
FIG. 6 is a detailed view of another portion of the rotor and stator illustrated in FIG. 4.

The enlarged pole gap between segments 40 and 42 is illustrated in greater detail in FIG. 5. It will be appreciated that by adding a 20 μm space between the first and second segments, the second segment 42 is moved to the right by 20 μm. This results in 20 μm less space for the subsequent segment as is illustrated in FIG. 6. Thus, stator pole 60 is separated from the first pole 62 in the next segment by only 24 μm. In order to accommodate the coils for poles 62 and 64, pole 60 is eliminated altogether and is therefore indicated in FIG. 6 by broken lines. Thus, although it was mentioned that there are substantially 30 poles in each segment, it will be appreciated that one pole falls away for each third segment.

Figure 7:
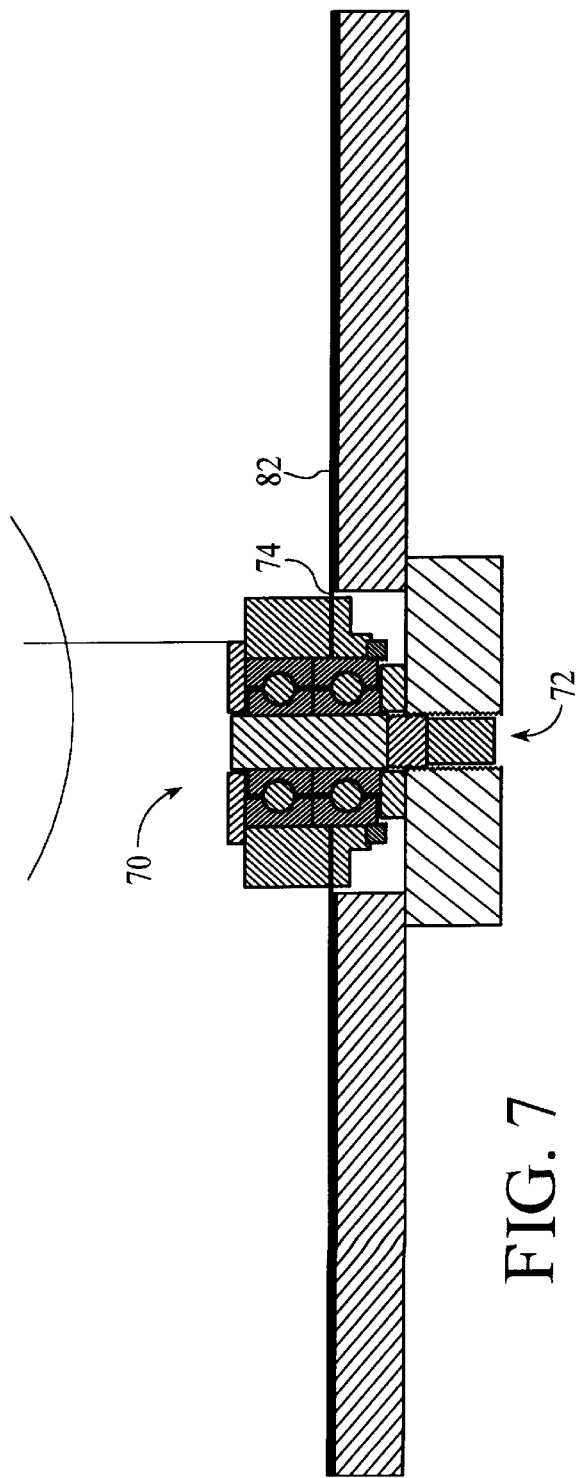
FIG. 7 is a sectional side view of a ball bearing assembly connected to a rotor and stator of the invention.
Figure 8:
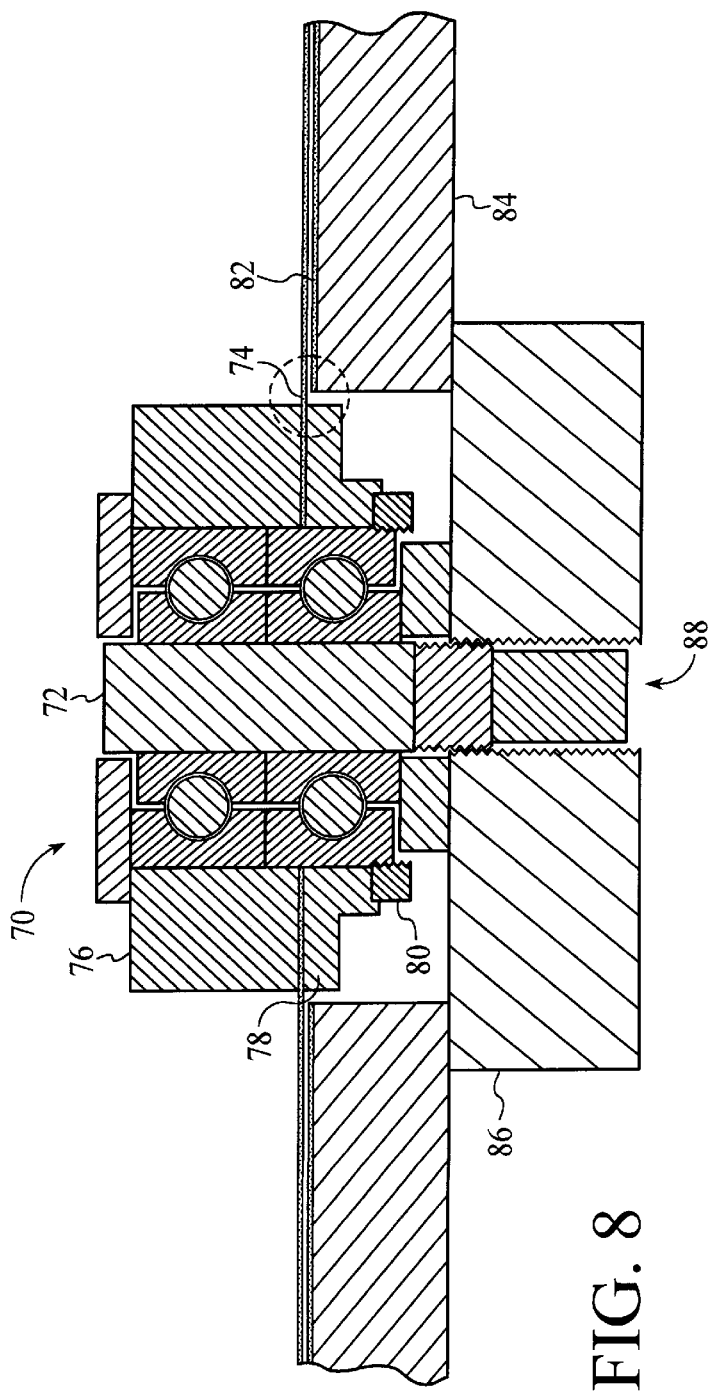
FIG. 8 is a detailed sectional side view of the ball bearing assembly of FIG. 7.
Figure 9:
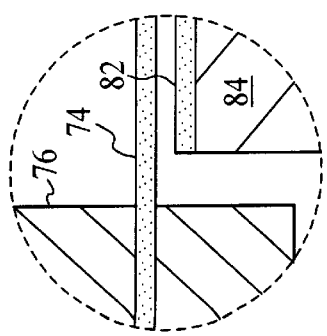
FIG. 9 is a detailed sectional side view of a portion of the assembly of FIG. 8, showing the rotor and stator more clearly.
Figure 10:
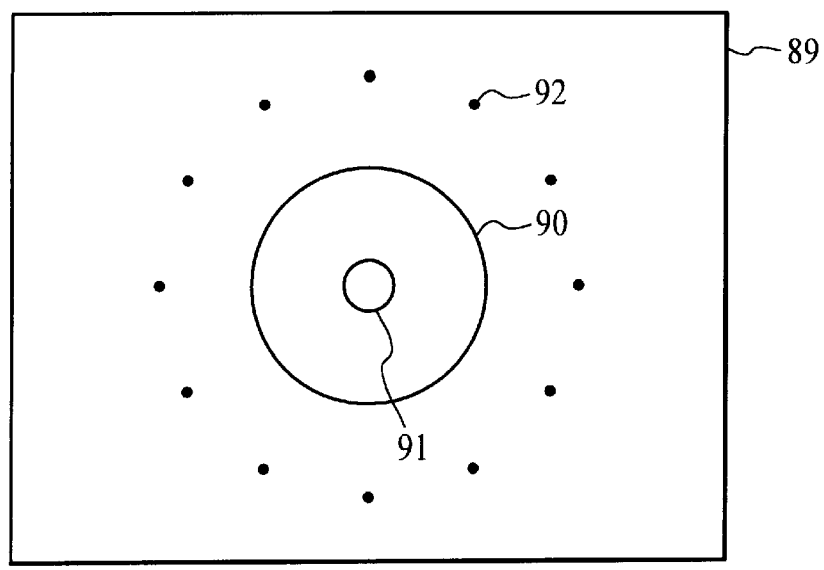
FIG. 10 is a schematic plan view, not to scale, of a glass mask for aligning the rotor relative to a bearing assembly.
Figure 11:
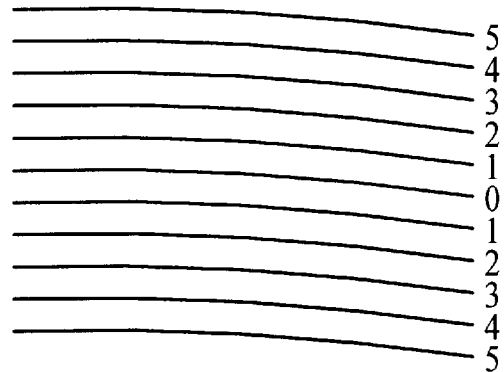
FIG. 11 is a detailed view of the annular alignment rings illustrated in FIG. 10.
Figure 12:
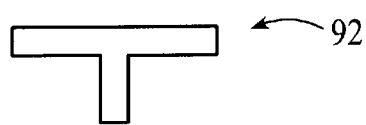
FIG. 12 is a detailed view of a fiducial on the glass mask.

As mentioned above, the ideal pole height is 50% of the space between the poles. Since the space between the stator poles is 44 μm, the ideal pole height for the stator is 22 μm. In order to maximize flux linkage it is therefore critical that the gap between the rotor and stator poles be as small as possible. By using a pancake configuration as discussed above in which the flexible rotor is spaced from the stator by an air cushion, a less than 75 μm thick motor can be formed in which each of the rotor and stator disks is only 35–37 μm in thickness. The air gap between the rotor and stator is thus only 1–2 μm. In order to centralize the rotor relative to the stator a jewel bearing may be used. However, in critical situations such as magnetic storage devices having 5,000–10,000 tracks per inch, run out is to be reduced to a minimum making a fluid bearing a better choice. By way of example, a standard ball bearing is used in the embodiment illustrated in FIGS. 7 and 8. The bearing 70 supports a central shaft 72. The rotor 74, illustrated more clearly in FIG. 9, is secured to the hub 76 by means of a lock ring 78 that clamps the rotor between itself and the hub 76. The lock ring 78, in turn, is held in place by means of an internally threaded ring 80. For added support the rotor 74 is bonded to the lower surface of the hub 76. The bond may be an epoxy or reflow solder bond. The stator 82, in turn, is bonded to a support plate 84. The support plate 84 can consist of a variety of materials, for example, aluminum or ceramic. It is bonded to a hub 86, for example by means of an epoxy or reflow solder bond. The hub 86 includes a central internally threaded bore 88 engaging a complementary threaded portion of the central shaft 72. This allows the bearing 70 and rotor 74 to be vertically adjusted relative to the stator 82 to adjust the spacing between the rotor and stator. Like the support plate 84, the hub 86 can be made from a variety of materials, for example, aluminum or ceramic. The process of securing the rotor 74 to the hub 76 involves centralizing the rotor 74 relative to the central shaft 72. This is achieved by means of alignment rings photolithographically formed on a glass mask as shown in FIG. 10. The rings, indicated generally by reference numeral 90 comprise a plurality of concentric numbered rings as illustrated in the magnified view of FIG. 11. In the embodiment illustrated in FIG. 11, eleven concentric rings are shown numbered outwardly and inwardly from 1–5 on either side of a central ring numbered "0". The central ring numbered "0" has a diameter corresponding substantially to the outer diameter of the hub 76. The rings 90 ensure centralizing of the glass mask 89 relative to the shaft 72. During assembly, the bearing 70 is placed upside down and the rotor 74 is placed on the hub 76, whereafter the glass mask 89 is placed on top of the rotor 74 by placing the central opening 91 over the rotor 70, the opening 92 being large enough to accommodate the lock ring 78 that will subsequently be used to secure the rotor 74. Since the alignment rings 90 merely serve to align the glass mask 89 relative to the center of the bearing 70, markings are required for aligning the rotor 74 relative to the glass mask 89. This is achieved by aligning fiducials 92 formed lithographically on the glass mask 89 (illustrated in FIG. 10) and corresponding fiducials photolithographically formed along the perimeter of the rotor 74. The fiducials on the glass mask 92 are indicated in greater detail in FIG. 12 and have a T-shaped configuration. These are spaced at 30° intervals along a circumference corresponding to the peripheral circumference of the rotor 74. The fiducials 94 on the rotor circumference are illustrated in FIG. 13. The fiducials 94 are substantially identical to the fiducials 92 and are also spaced apart at 30° intervals.

In order to insure proper alignment between the rotor and stator the central shaft 72 is engaged in the threaded hole 88, whereafter the bearing 70 with the rotor 74 and the hub 86 are adjusted relative to the support plate 84 and stator 82. Once the rotor is correctly aligned relative to the stator the hub 86 is bonded to the support plate 84. Proper alignment between the rotor and stator is insured by aligning the fiducials 94 with fiducials 96, illustrated in FIG. 14. The fiducials 96 are also formed photolithographically at 30° intervals along a circumference of the stator corresponding to the circumference of the rotor. The fiducials 96 have two cross arms 97 and 98 that are longer and thinner than the cross arms 99 of the fiducials 94 to ensure that the fiducials 96 are visible under the fiducials 94 since the stator 82 is aligned with the rotor 74 while the bearing 70 is in an upright position.

Figure 16:
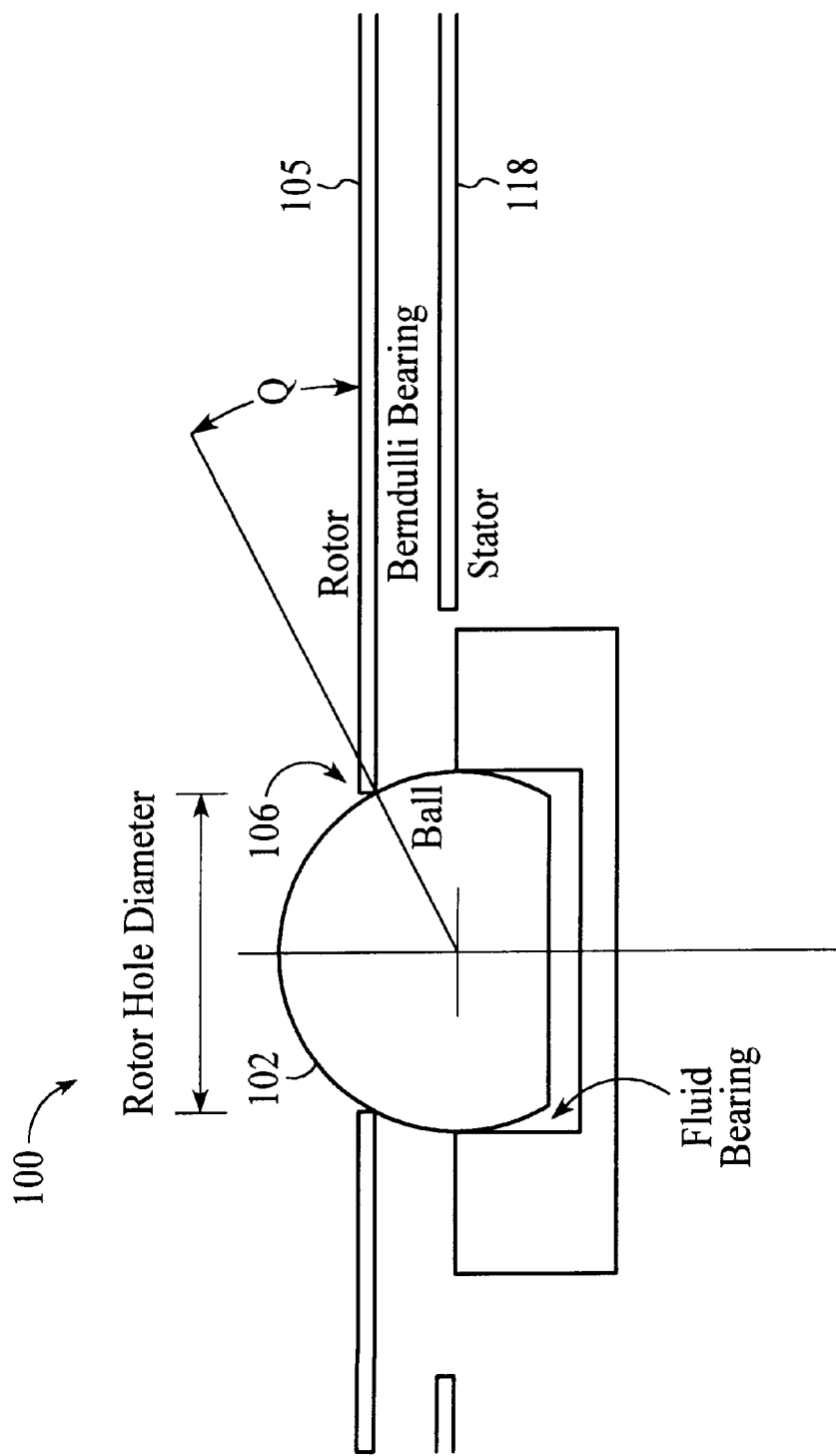
FIG. 16 is a detailed side view of the alignment means illustrated in FIG. 15.

Another method of insuring that the rotor is centralized relative to the bearing is to provide the bearing with a centralizing nib in the form of a ball, the central axis of which is aligned with the rotational axis of the bearing. Such a bearing is illustrated in FIGS. 15 and 16. The bearing 100 includes a ball 102 secured to the shaft 104. By providing the rotor 105 (FIG. 16) with a central hole 106 having a diameter somewhat smaller than the centralizing ball 102, the rotor 105 is automatically centralized relative to the rotational axis of the bearing by simply placing the central hole 106 of the rotor over the ball 102 so that the rotor 105 engages the centralizing ball 102. The rotor 105 and stator 108 are shown as one line in FIG. 15 due to their close proximity. In the detailed view of FIG. 16, the rotor 105 and stator 108 are, however, clearly illustrated.

Figure 17:
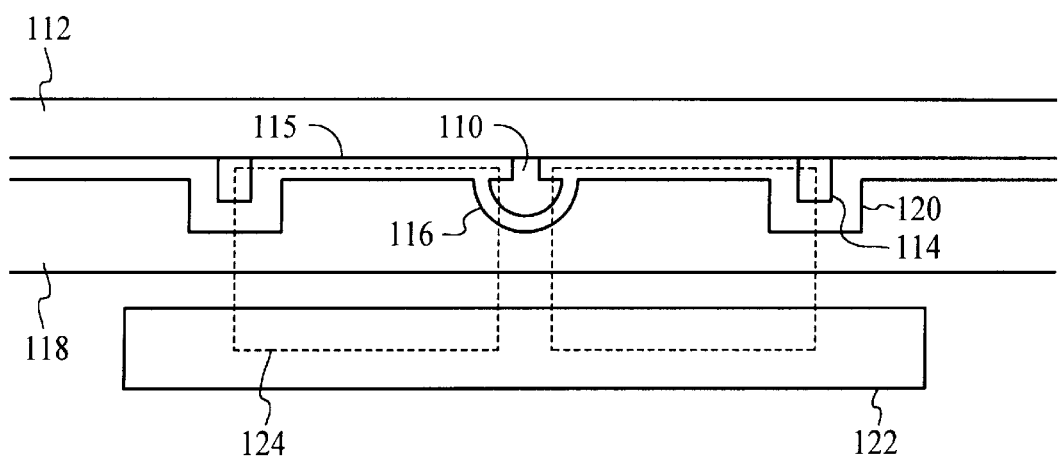
FIG. 17 is a sectional side view of another embodiment of a bearing assembly in accordance with the invention.

Instead of using a bearing as described above, the rotor disk can be centralized relative to the stator disk by making use of an arrangement as illustrated in FIG. 17 in which a central nib 110 extends from a lower surface of the rotor 112. This can be formed from an amorphous nickel material. If the stator is made from an amorphous material, the use of an amorphous material for the nib 110 avoids the need for a lubricant since the amorphous material has no crystal boundaries. An annular ring 114, formed from Permalloy also extends from the lower surface of the rotor 112 and is connected to a Permalloy plate 115. The nib 110 magnetically engages a complementary recess 116 in the stator 118 but does not touch when spinning. The ring 114 similarly engages a complementary recess 120 in the stator 118. A magnet such as a niodemium cobalt magnet 122 is mounted adjacent the lower surface of the stator 118 and includes a central north pole and annular south pole thereby forming flux lines as indicated by reference numeral 124 passing through the ring 114 and plate 115. The flux linkage between the magnet and the ring 114 insures that the rotor remains centralized relative to the magnet. The nib 110, ring 114, plate 115 and magnet 122 thus act as a bearing for the rotor.

Figure 18:
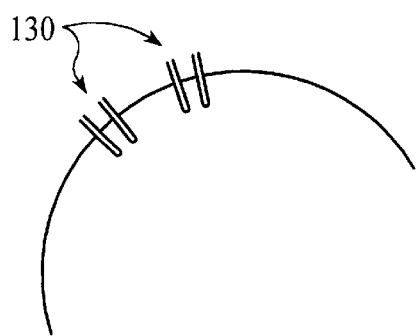
FIG. 18 is a schematic representation of detector coils in accordance with the invention formed on the stator.
Figure 19:
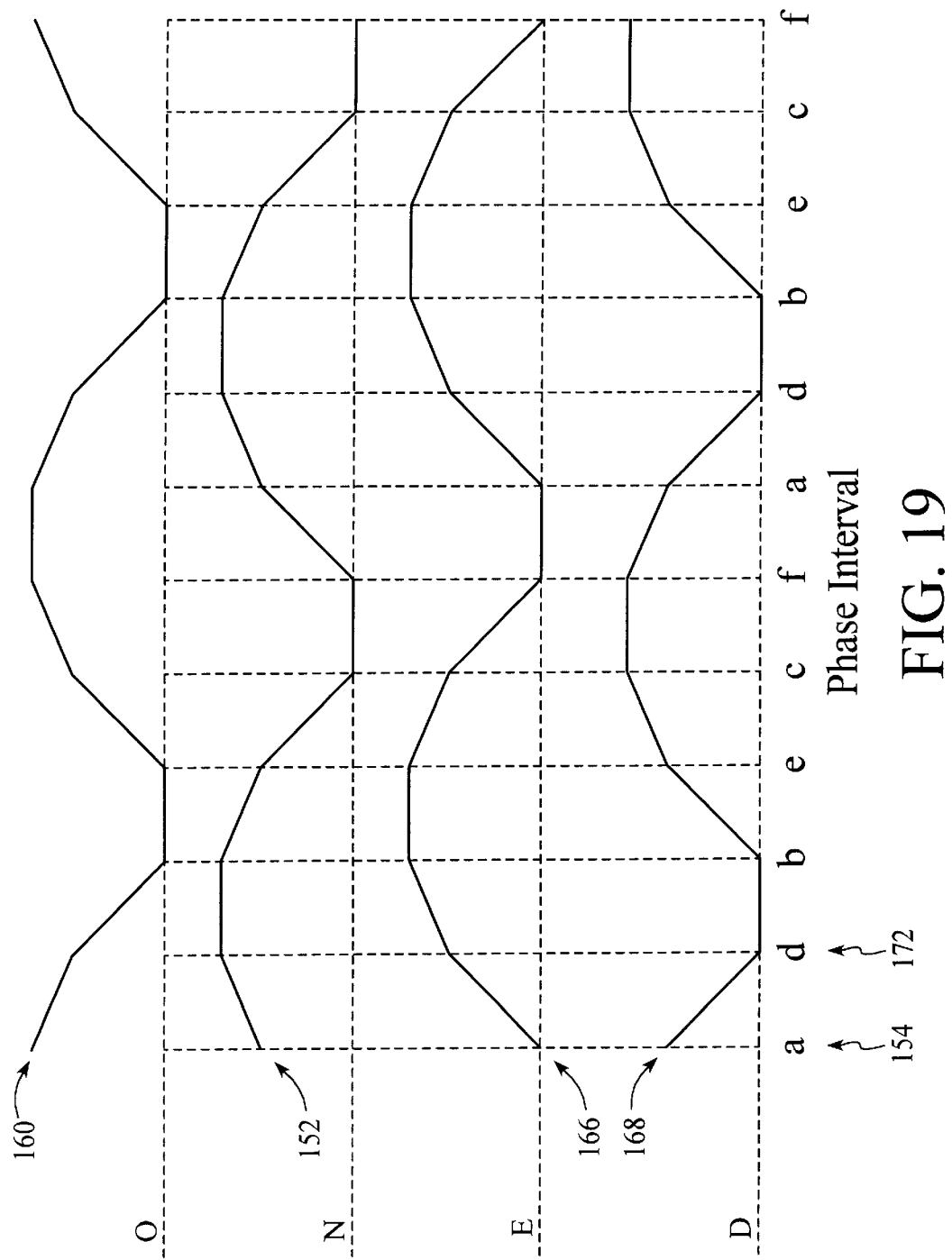
FIG. 19 are magnetic flux linkage curves for the poles associated with the detector windings.
Figure 20:
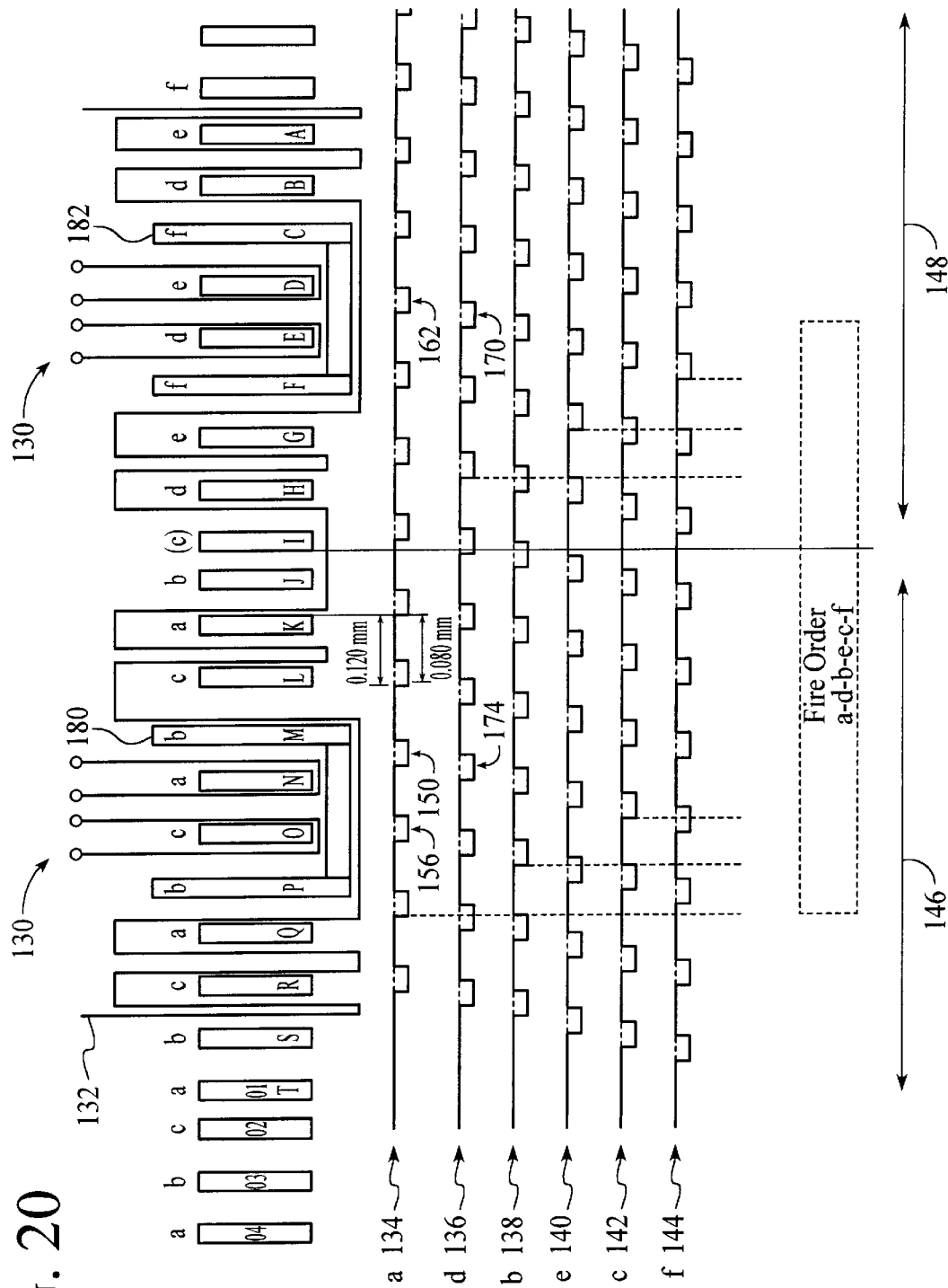
FIG. 20 is a schematic representation of the rotor and stator poles showing the detector windings and the high frequency winding.
Figure 21:
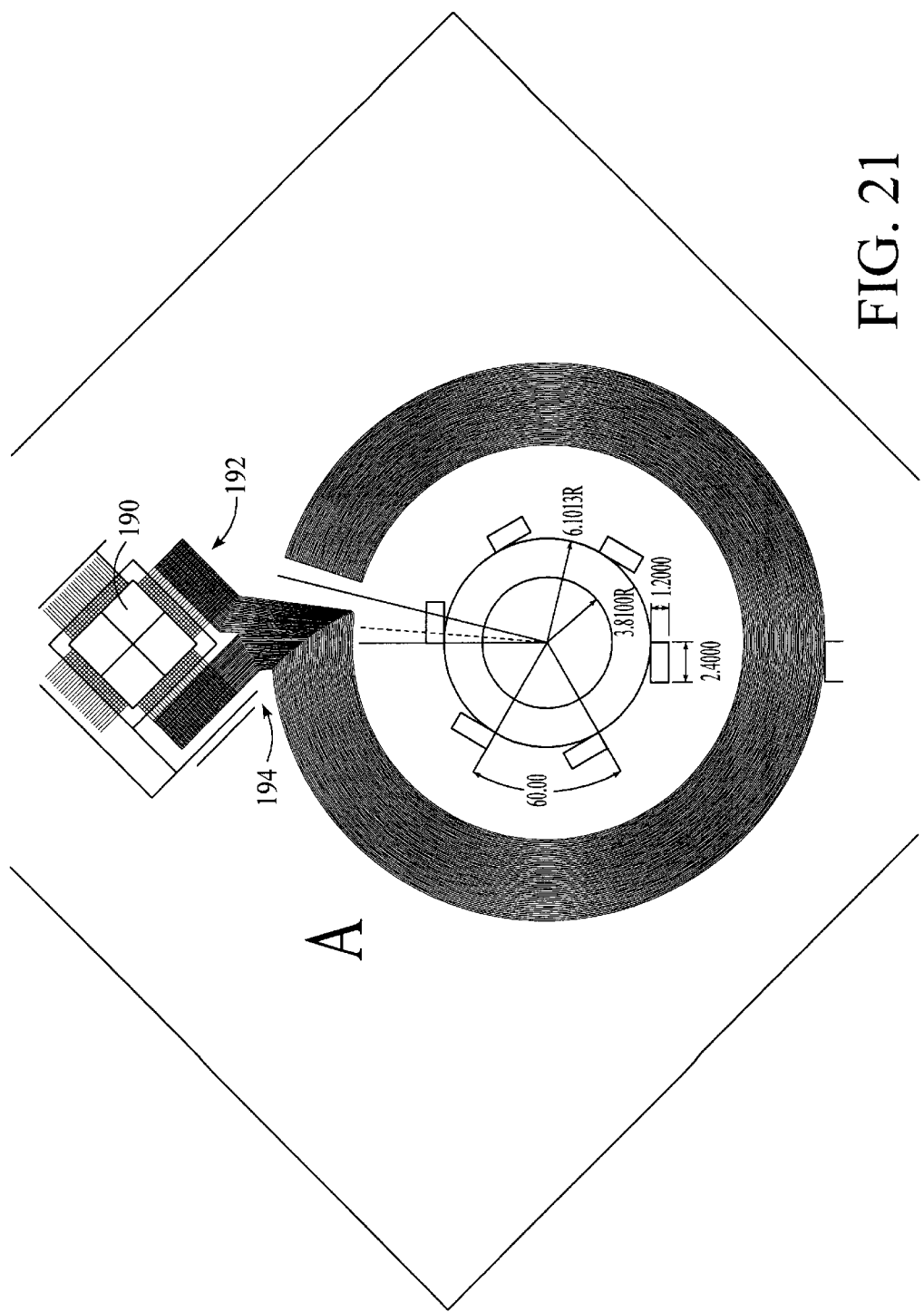
FIG. 21 is a plan view of a stator with its windings, connected to a controller semiconductor chip.

In order to insure correct firing of the stator windings, accurate detection of the position of the rotor relative to the stator is required. This is achieved by means of detector windings formed on four of the stator poles as illustrated in FIG. 18. The detector windings 130 are illustrated in greater detail in FIG. 20 and are associated with four of the stator poles that are indicated in FIG. 20 by the letters O, N, E, and D. A high frequency signal is applied to high frequency winding 132 to induce currents in the detector windings 130. Current flowing through the high frequency winding 132 induces magnetic flux in the poles indicated by the letters R, Q, and L, K as well as in the poles H, G and B, A. The flux from poles R, Q and L, K links with the poles O, N. Similarly, the flux from poles H, G and B, A links with poles E, D. This induces signals in the detector windings 130. The amount of flux linkage determines the magnitude of the signal in each detector winding. Thus the signals detected in the detector windings reflect the magnitude of the flux linkage between the rotor poles and the stator poles at various positions of a the rotor poles relative to the stator poles O, N, E, D. The positions of the rotor poles relative to the stator poles are given at various times by the rotor depictions indicated by reference numerals 134, 136, 138, 140, 142, and 144. The depiction of the rotor poles illustrated by reference numeral 134 indicates the position of the poles when phase "a" is fired. For ease of understanding the phases "a", "b", "c" for sector 146 and phases "d", "e", "f" for sector 148 are shown above the stator poles. It will be noted that the first "c" phase pole is shown in parentheses. This is due to the fact that the first pole in segment 148 falls away. When phase "a" is ready for firing the leading edge of the rotor pole 150 is aligned with the trailing edge of the detector pole N which corresponds to a phase "a" stator pole. At this point flux linkage between the rotor pole 150 and detector pole N is increasing as illustrated in FIG. 17 by the flux linkage curve 152 at location 154 along the horizontal axis. The horizontal axis represents time, thus successive intervals along the horizontal axis represent the instances when the various phases are ready to fire, the firing order being a-d-b-e-c-f. When phase "a" is ready to fire, flux linkage between the rotor pole 156 and the detector stator pole O will be at a maximum since these two poles are perfectly aligned. This is illustrated by the curve 160 in FIG. 19 for detector pole O at location 154 along the horizontal axis. The flux linkage between the rotor pole 162 and the detector pole E is at zero and is about to increase as illustrated by the curve 166, whereas the flux linkage between the rotor pole 162 and the detector pole D is very low and is decreasing as indicated by the curve 168 for the detector pole D. Since the rotor is shown as moving from right to left in FIG. 20, the depiction given by reference numeral 136 of the rotor poles shows the poles as having moved to the left so that the next phase that is ready for firing is phase "d". This corresponds to detector coil E, the trailing edge of which corresponds to the leading edge of the rotor pole 170. When phases "d" are ready for firing the flux linkage between phases "d" and the next set of rotor poles will thus be increasing as indicated in FIG. 19 by curve 166 at time interval 172. At this point curve 152 in FIG. 19 is peaking indicating that flux linkage is at a maximum between detector pole N and rotor pole 174, since those two poles are aligned with each other. This is shown in FIG. 20 in which the rotor pole 174 is aligned with the detector pole N. As is shown in FIG. 20, the detector poles O, N, E, D, correspond to phases "c", "a", "d", "e", respectively. Accordingly, only 4 of the 6 phases are monitored to obtain exact positional information about all 6 phases. Thus using only four detector coils to monitor the flux linkage, the exact location of the rotor relative to the stator can be determined for a six phase system as in the present embodiment. To avoid interference with the stator windings (not shown) that serve as the motor excitation windings, shields 180 and 182 are provided around the poles O, N and E, D, respectively. The motor windings connected to their respective bus lines, as well as the detector windings 130 and high frequency signal windings 132 are connected to a controller chip 190 as illustrated in FIG. 21. The motor bus lines, detector windings and high frequency signal windings are indicated generally by reference numeral 192 in FIG. 21. The high frequency signal windings and detector windings are indicated more specifically by reference numeral 194.

The method of manufacturing a motor in accordance with the invention will now be described in greater detail below. The particular configuration considered is a pancake shaped motor as discussed above. The rotor and the stator of this particular embodiment are made from METGLAS, manufactured by Allied Signal Inc. METGLAS is an amorphous material that includes 45% nickel, 42% iron, and trace amounts of molybdenum and boron. Thin plates of the material are formed by depositing the molten material onto a chilled spinning copper wheel, typically rotating at 25 mph, to cool the material at a rate of 1,000,000° C. per second to form a thin ribbon of the material. As mentioned above, METGLAS has high permeability, and low coercivity properties that make it ideally suited for the particular application. The fact that it is an amorphous material allows extremely accurate etching of small areas without being limited by grain boundaries associated with crystalline materials. It can be produced either as a magnetic material having high permeability by using it in its standard form, or as a non-magnetic material that is impermeable by adding impurities such as silicon, chromium or phosphorous. Since the poles have to be made from a magnetic material, preferably magnetic METGLAS is used for both the rotor and stator disks. However, in certain circumstances, as will be discussed below for longitudinal recording applications, it may be necessary to use a non-magnetic rotor disk. Definite advantages can, however, be achieved through the use of a magnetic material for the rotor and stator. Specifically, the time for manufacturing the poles is considerably reduced when an etching process is adopted as opposed to a plating process. Typically material can be etched away on METGLAS at a rate of approximately 21 microns per 40 seconds. This contrasts favorably with the significantly slower rate of 1 hour per 12 microns for a plating procedure.

Figure 22:
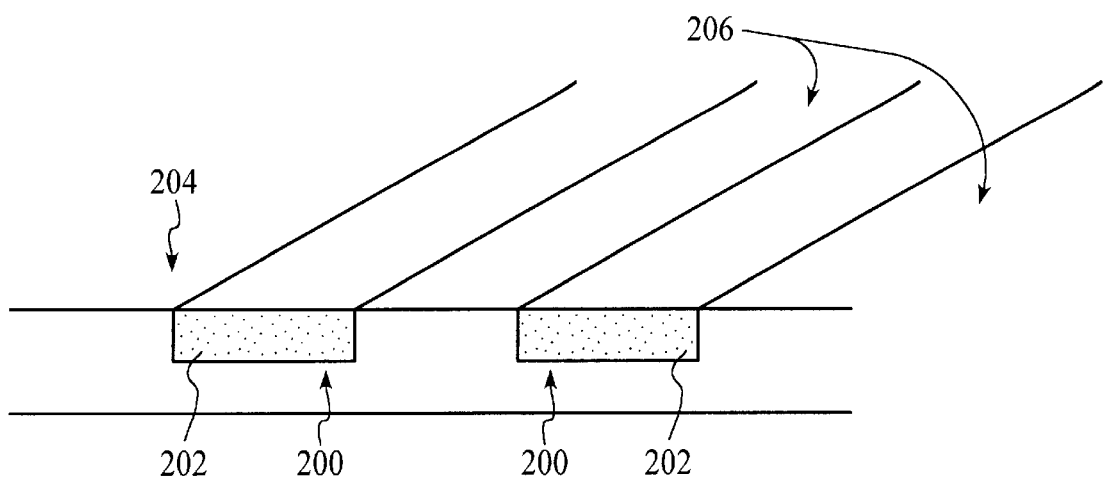
FIG. 22 is an isometric sectional view of a stator illustrating the etched poles.

The etching process adopted for the stator as well as for the rotor in applications where the motor is to be used as part of a recording medium that makes use of a non-longitudinal recording process is considered with respect to FIG. 22. The etching process may be any kind of etching process, for example, a chemical or ion beam process. Photoresist is deposited on top of the plate of METGLAS, and a mask is used to selectively cover the areas that are to constitute the poles. The exposed portions 200 are then etched away using an ion beam or chemically. Thereafter, a non-magnetic material such as nickel phosphorus (NiP) is filled into the etched away areas as indicated by reference numeral 202. The surface 204 is then lapped to produce a smooth disk surface comprising poles 206 and intermediate portions 200. It will be appreciated that instead of an amorphous material such at METGLAS, a crystalline material having appropriate properties, such as PERMALLOY, discussed above, may be used.

Figure 23:
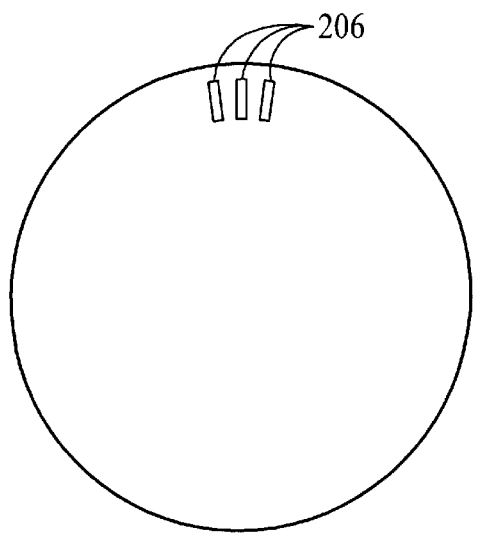
FIG. 23 is a plan view of a typical rotor or stator disk in accordance with the invention, showing three of the poles.

A typical rotor or stator disk showing some of the poles 206, is illustrated in FIG. 23.

Figure 24:
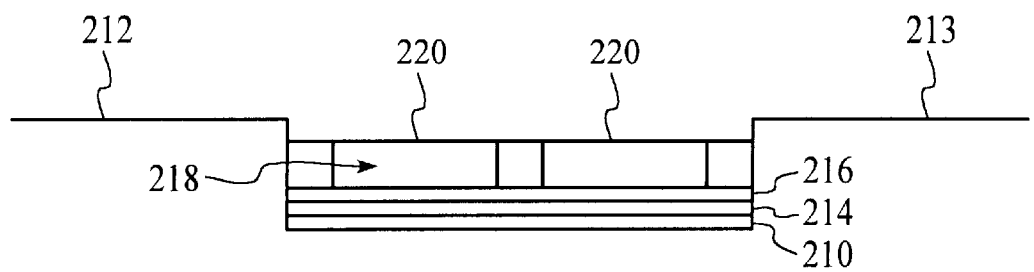
FIG. 24 is a sectional side view of part of a stator in accordance with the invention showing the process of manufacturing the windings.
Figure 25:
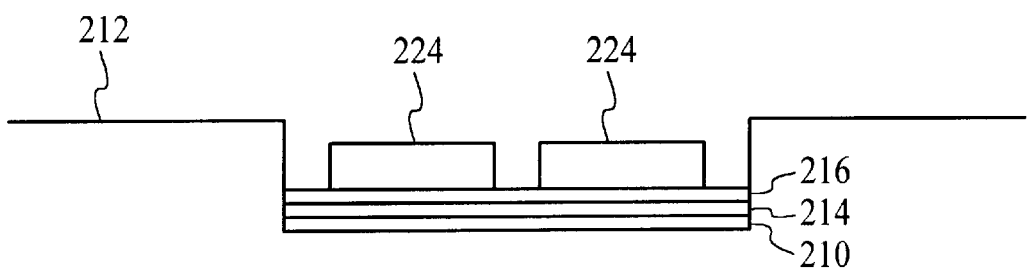
FIG. 25 is a sectional side view of the portion of the stator of FIG. 24 showing the process of manufacturing the windings in a more advanced stage of manufacture.
Figure 26:
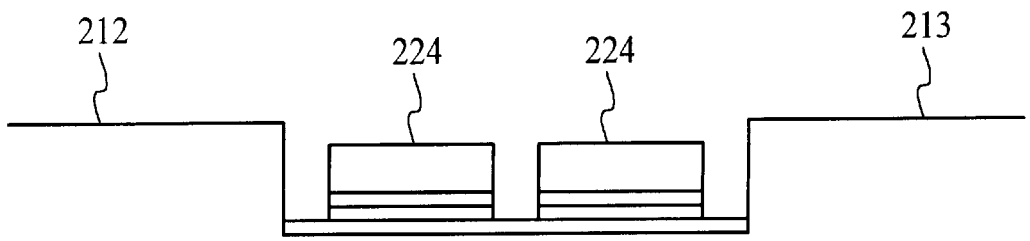
FIG. 26 is a sectional side view of the portion of the stator of FIG. 24 showing the manufacture of the windings in yet a further stage of manufacture.

In order to produce the windings on the stator disk the areas between the poles are not initially filled with nickel phosphorus. Instead, as illustrated in FIG. 24, an insulating layer 210 is deposited in the hollow between the pole areas 212, 213. The layer 210 can be a photoresist that has been baked to resist etching. A seed layer of chrome 214 and a seed layer of copper 216 are then deposited on top of the insulating layer 210. Thereafter, photoresist is spun onto the copper layer, the layer of photoresist being indicated by reference numeral 218. A mask is then used to expose only the portions indicated by reference numeral 220. Once the exposed portions have been removed, copper islands are formed on the seed layer 216 by an electroplating process. Thereafter, the remaining photoresist is removed between the copper islands 224 as illustrated in FIG. 25. Using a chemical process or an ion beam, the shorting out seeding layers 216, 214 are then etched away to leave the two copper islands 224 to define the windings for the adjacent poles 212, 213, as shown in FIG. 26.

Figure 27:
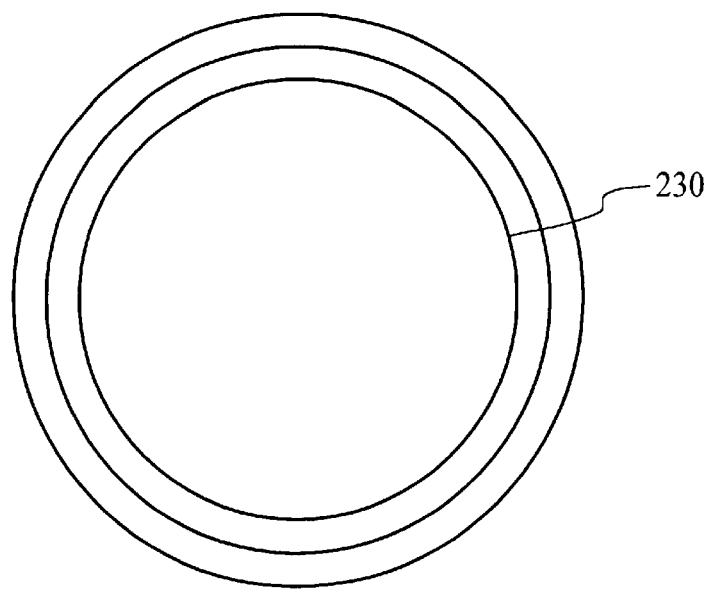
FIG. 27 is a plan view of a rotor illustrating the annular band along which the rotor poles are formed.
Figure 28:
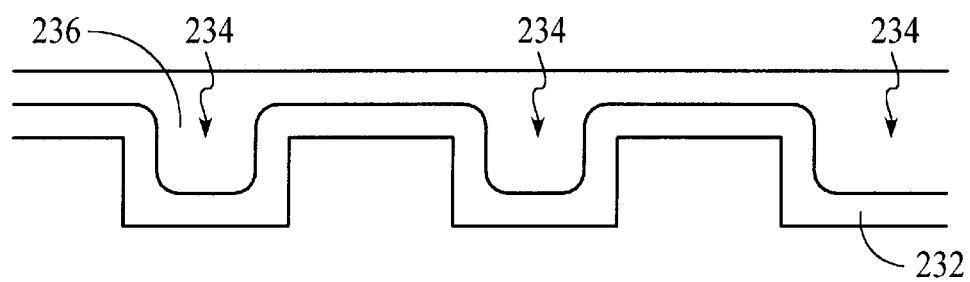
FIG. 28 is a sectional side view of part of the annular band illustrated in FIG. 27, showing the process of manufacturing poles for a longitudinal recording application.
Figure 29:
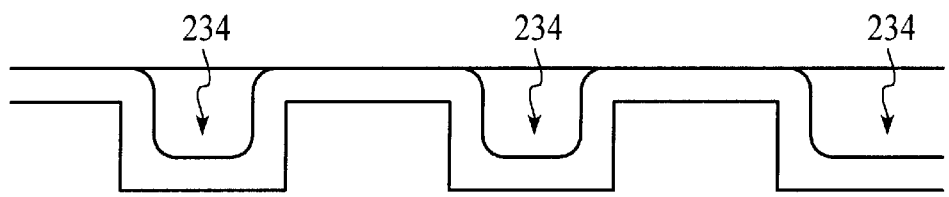
FIG. 29 is a sectional side view of the portion of the annular band illustrated in FIG. 28, showing the pole manufacturing process in a further stage of manufacture.
Figure 30:
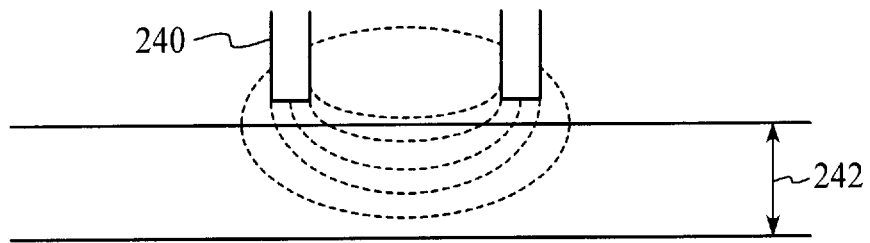
FIG. 30 is a schematic representation of a recording head and a recording layer for longitudinal recording.
Figure 31:
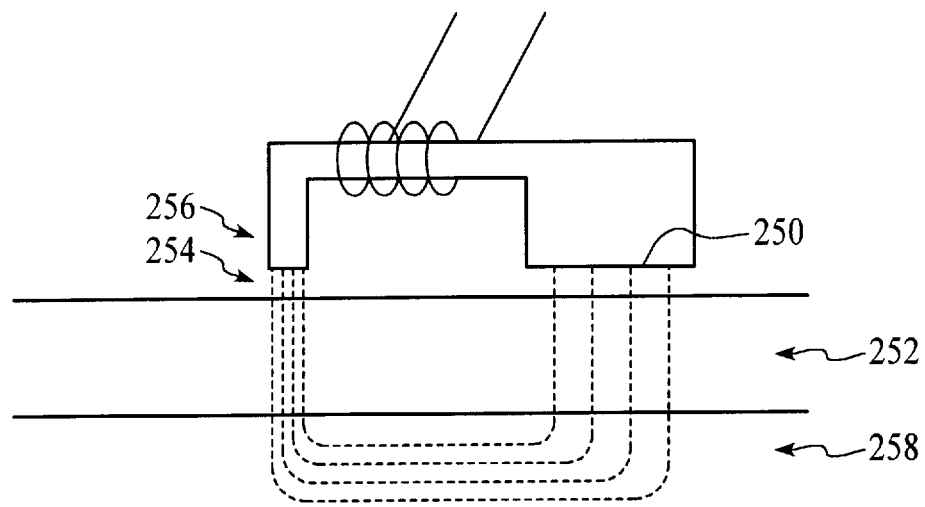
FIG. 31 is a schematic representation of a recording head and a recording medium for non-longitudinal recording.

As mentioned above, in longitudinal recording applications, it is necessary that the rotor be made of a non-magnetic material such as non-magnetic METGLAS. In this situation, a first removal of material is performed to remove an annular band 230 to a depth of approximately 8 microns as is illustrated in FIG. 27. This is followed by a second, selective removal of disk material intermediate the portions that are to define the poles. This is performed to a depth of approximately 18 microns. A magnetic material such as Permalloy is then plated over the entire pole band 230 as illustrated in FIG. 28. The hollow portions 234 are then filled with a non-magnetic material such as nickel phosphorous. This is indicated by reference numeral 236. Thereafter, the surface is lapped to a smooth surface to expose the Permalloy at the pole areas as indicated by FIG. 29. In this way a rotor disk is produced, formed from a non-magnetic material having magnetic poles. By using a non-magnetic disk material for the rotor, the substrate for the magnetic recording medium in a longitudinal recording application is non-magnetic and will therefore not tend to distort the magnetic flux lines produced by the recording head. This is illustrated in FIG. 30 in which the trailing magnetic head pole that performs the recording is indicated by reference numeral 240. The magnetic recording medium which is a high coercivity coating is formed directly on the rotor disk in this embodiment, and is indicated by reference numeral 242 and is typically only about 630 $\mu$m in thickness. It will be appreciated that a separate recording plate comprising a recording layer on a substrate can be secured to the rotor of a motor instead of forming the recording layer directly on the rotor. Since the magnetic poles of the magnetic domains in the recording medium are to be aligned substantially horizontally in a longitudinal recording application, it will be appreciated that realignment of the magnetic domains will be most effective nearest the recording head 240 and will fall off with distance from the recording head due to the ever weakening flux density as one moves away from the recording head. Underlying atoms that have not been realigned tend to interfere with the aligned atoms. It is therefore essential that the atoms be aligned to substantially the entire depth of the recording layer 242. For this reason it is necessary that the recording layer 242 in a longitudinal recording application be extremely thin as opposed to that in a perpendicular recording application in which the layer is typically of the order of 0.5–1 μm in thickness. In a perpendicular recording application the flux lines travel substantially vertically through the recording layer into the magnetic substrate and are then directed by the magnetic substrate to the face 250 as indicated in FIG. 31. As mentioned above, the recording layer 252 is of the order of 0.5–1 μm in thickness. The flux lines, indicated by reference numeral 254, travel substantially perpendicularly through the recording layer 252 from the head 256 into the magnetic substrate 258 which directs and diffuses the flux lines horizontally across to the large area return face 250. The difficulties experienced in prior art recording media is the need to fabricate a thick recording layer and the need for tight physical coupling between the recording head and the medium. It is therefore essential that the rotor substrate supporting the recording layer comply with the requisite tight tolerances.

When using glassy metals (amorphous materials) such as METGLAS as the rotor substrate for a recording medium certain problems are encountered as a result of the large temperature variances caused when the recording layer is deposited on the glassy metal surface. Furthermore, special treatment of the glassy metal is required to achieve the smoothness required for use in a recording medium application. A nominal surface roughness typically exists in the glassy metal after its formation. In accordance with the invention, when a glassy metal is used as a substrate for a recording medium it is prepared to comply with the requisite high tolerances. Undulations and planar variances are initially resolved by placing the glassy metal between a pair of copper plates and gradually heating the glassy metal to soften it and permit it to conform to the flat surfaces of the copper plates that simultaneously exert pressure on opposite surfaces of the glassy metal. Thereafter any further undulations are addressed by means of an electroless metalization process in which the material is placed in an electrical bath of nickel. Before the metalizing step, however, the material is stabilized. Stabilizing the material insures that it does not subsequently distort due to temperature variances in the material when exposed to elevated temperatures during the various stages of manufacture of the rotor and stator. For example, during the manufacturing process, the material is exposed to high temperatures when photoresist is baked and when a recording layer is applied to the rotor in situations where the motor is to be used in a recording medium application. In order to stabilize the material it is placed in a partial vacuum in which the gasses in the partial vacuum are inert gasses to avoid oxidation layers forming on the material. The material is then exposed to heat and pressure in the partial vacuum to elevate its temperature to a point at which subsequent exposures of the material to elevated temperatures will not cause distortions of the material. Once the material has been stabilized it is blanked to size, cleaned, and activated using appropriate chemical activation, to remove oxides and scale. Thereafter, if the motor is to be used in a recording medium application, a recording layer is sputtered onto the glassy metal or is applied by a metal ion coating process. The recording layer supported on the glassy metal substrate is then secured to the rotor of a motor. Instead, the glassy metal substrate material can itself constitute the rotor, in which case poles are etched into the opposite surface of the substrate material in a manner as discussed above.

Figure 32:
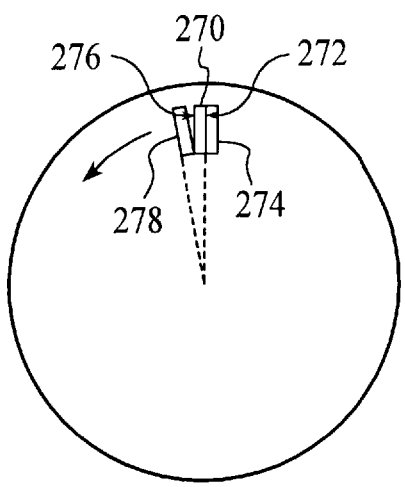
FIG. 32 is a schematic representation showing the relative orientations of rotor and stator poles to insure unidirectional movement of the rotor relative to the stator.

As mentioned above, the shape and orientation of the stator and rotor poles can be designed to ensure unidirectional motion. As illustrated in FIG. 32 the stator and rotor poles are arranged so that the firing stator pole 270 has a leading edge 272 lying substantially parallel to the adjacent edge of the next rotor pole 274, and a trailing edge 276 angled relative to the previous rotor pole 278. This maximum flux linkage with the rotor pole 274 ensures anticlockwise rotation of the rotor even if the stator winding 270 is fired slightly prematurely.

While the applications discussed above deal specifically with the materials METGLAS and Permalloy and the use of a pancake configuration it will be appreciated that any material having sufficiently low coercivity and sufficiently high permeability that is amenable to a pole manufacturing process using lithography, could be used. Similarly, the invention is not to be read as being limited to a pancake configuration but extends also to motors in which the rotor and stator poles are radially spaced from one another.

We claim:

1. A reluctance electric motor comprising:
    a substantially flat circular stator with a plurality of stator poles; and
    a substantially flat circular rotor having a plurality of rotor poles, the rotor being rotatably mounted relative to the stator and coaxial therewith, wherein the rotor further includes an amorphous ferromagnetic material having a ribbon structure as formed, the ribbon structure having a face and a side, the face having a width and the side having a thickness, the width of the face being greater than the thickness of the side, the face having the plurality of rotor poles formed therein, the rotor being rotatable mounted for rotation about an axis and is axially spaced from the stator, the rotor further being mounted on a bearing assembly defining a rotational axis;
    wherein the rotor has a central hole therein, and wherein the bearing assembly has a spherical bearing surface with a first diameter greater than a second diameter of the central hole for supporting and centering the rotor relative to the rotational axis when the central hole in the rotor is placed on the spherical bearing surface.

2. The electric motor of claim 1 further comprising a plurality of windings associated with the plurality of stator poles, the plurality of stator poles and the plurality of rotor poles being configured to ensure maximum flux linkage between a set of the plurality of stator poles having a portion of the plurality of windings, the portion of the plurality of windings being energized and a set of the plurality of rotor poles having a predetermined location relative to the set of the plurality of stator poles, for ensuring unidirectional movement of the rotor relative to the stator.

3. The electric motor of claim 1
    wherein the stator further includes a first substrate, the plurality of stator poles being formed on the first substrate; and wherein the rotor further includes a second substrate, the second substrate including the amorphous ferromagnetic material the plurality of rotor poles formed on the second substrate, wherein the plurality of stator poles are integrally formed on the first substrate and the plurality of rotor poles are integrally formed on the second substrate.

4. The electric motor of claim 3 wherein the stator comprises an amorphous ferromagnetic material or permalloy.

5. The electric motor of claim 3 wherein the motor includes a plurality of excitation windings, wherein a speed of movement of the rotor relative to the stator is proportional to a switching frequency at which power is applied to the plurality of excitation windings.

6. The electric motor of claim 1 wherein the rotor is flexible and portions thereof extending beyond the bearing surface are supported by an air cushion maintained by Bernoulli effect caused by an inflow of air into a space between the rotor and the stator due to a low pressure zone formed between the rotor and the stator.

7. An electric motor of claim 6, wherein air passages are formed in at least one of the rotor and the stator, the air passages passing through at least one of the rotor and the stator for channeling air into the space between the rotor and the stator.

8. The electric motor of claim 1 wherein the stator includes sensor winding means for sensing a relative position of a portion of the plurality of rotor poles relative to a portion of the plurality of stator poles.

9. The electric motor of claim 8 wherein the sensor winding means comprises four sensor windings associated with four of the plurality of stator poles for sensing magnetic flux linkage between said four stator poles and four of the plurality of rotor poles, and a high frequency signal winding for generating magnetic flux in said four stator poles.

10. The electric motor of claim 1 wherein the motor further includes a plurality of windings associated with the plurality of stator poles, the plurality of stator poles and the plurality of rotor poles being configured to ensure maximum flux linkage between a set of the plurality of stator poles whose windings are being energized and a set of the plurality of rotor poles having a predetermined location relative to the set of the plurality of stator poles, for ensuring unidirectional movement of the rotor relative to the stator.

11. The reluctance electric motor of claim 1 wherein the plurality of rotor poles are formed in the face by etching a portion of the face and lapping a remaining portion of the face.

* * * * *